(12) United States Patent
Ito

(10) Patent No.: US 10,309,467 B2
(45) Date of Patent: Jun. 4, 2019

(54) VEHICLE, CONTROLLER FOR VEHICLE, AND CONTROL METHOD FOR VEHICLE

(71) Applicant: TOYOTA JIDOSHA KABUSHIKI KAISHA, Toyota-shi, Aichi-ken (JP)

(72) Inventor: Kohei Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 15/412,848

(22) Filed: Jan. 23, 2017

(65) Prior Publication Data

US 2017/0219027 A1    Aug. 3, 2017

(30) Foreign Application Priority Data

Feb. 1, 2016    (JP) .................................. 2016-017543

(51) Int. Cl.
*F16D 48/06*        (2006.01)
*F16H 63/46*        (2006.01)

(52) U.S. Cl.
CPC ............. *F16D 48/06* (2013.01); *F16H 63/46* (2013.01); *B60Y 2300/20* (2013.01); *F16D 2500/102* (2013.01); *F16D 2500/1045* (2013.01); *F16D 2500/10412* (2013.01); *F16D 2500/3067* (2013.01); *F16D 2500/30421* (2013.01); *F16D 2500/30814* (2013.01); *F16D 2500/30816* (2013.01); *F16D 2500/3109* (2013.01); *F16D 2500/3125* (2013.01); *F16D 2500/3166* (2013.01); *F16D 2500/31413* (2013.01); *F16D 2500/50293* (2013.01);
(Continued)

(58) Field of Classification Search
CPC ............. F16D 48/06; F16D 2500/1045; F16D 2500/70408; F16D 2500/50293; F16D 2500/3125; F16D 2500/30814; F16D 2500/30421; F16D 2500/31413; F16D 2500/30816; F16D 2500/102; F16D 2500/3067; F16D 2500/10412; F16D 2500/7044; F16D 2500/70426; F16D 2500/3166; F16D 2500/3109; F16H 63/46; B60Y 2300/20
See application file for complete search history.

(56) References Cited

U.S. PATENT DOCUMENTS

2003/0073535 A1* 4/2003 Eguchi .................. B60W 10/02
                                                         475/175
2009/0018757 A1* 1/2009 Kobayashi .......... B60W 10/026
                                                         701/112
(Continued)

FOREIGN PATENT DOCUMENTS

EP      2631133 A1    8/2013
JP    2011-140303 A    7/2011

*Primary Examiner* — Jacob S. Scott
*Assistant Examiner* — Lori Wu
(74) *Attorney, Agent, or Firm* — Oliff PLC

(57) ABSTRACT

A clutch is controlled to increase torque capacity of the clutch when fluctuations in torsional torque generated in a power transmission route between the clutch and a drive wheel are larger than a specified value during deceleration traveling. Accordingly, engine brake whose magnitude corresponds to an increased amount of the torque capacity of the clutch is actuated. Therefore, the fluctuations in the torsional torque can be suppressed by the engine brake.

15 Claims, 8 Drawing Sheets

(52) U.S. Cl.
CPC ............... *F16D 2500/7044* (2013.01); *F16D 2500/70408* (2013.01); *F16D 2500/70426* (2013.01)

(56) References Cited

U.S. PATENT DOCUMENTS

| | | | |
|---|---|---|---|
| 2012/0028759 A1* | 2/2012 | Tsujimura | ............... F16D 48/06 477/175 |
| 2013/0211653 A1* | 8/2013 | Matsui | ................. F02D 41/123 701/22 |
| 2018/0073632 A1* | 3/2018 | Kamiya | ................ F02D 41/123 701/22 |

* cited by examiner

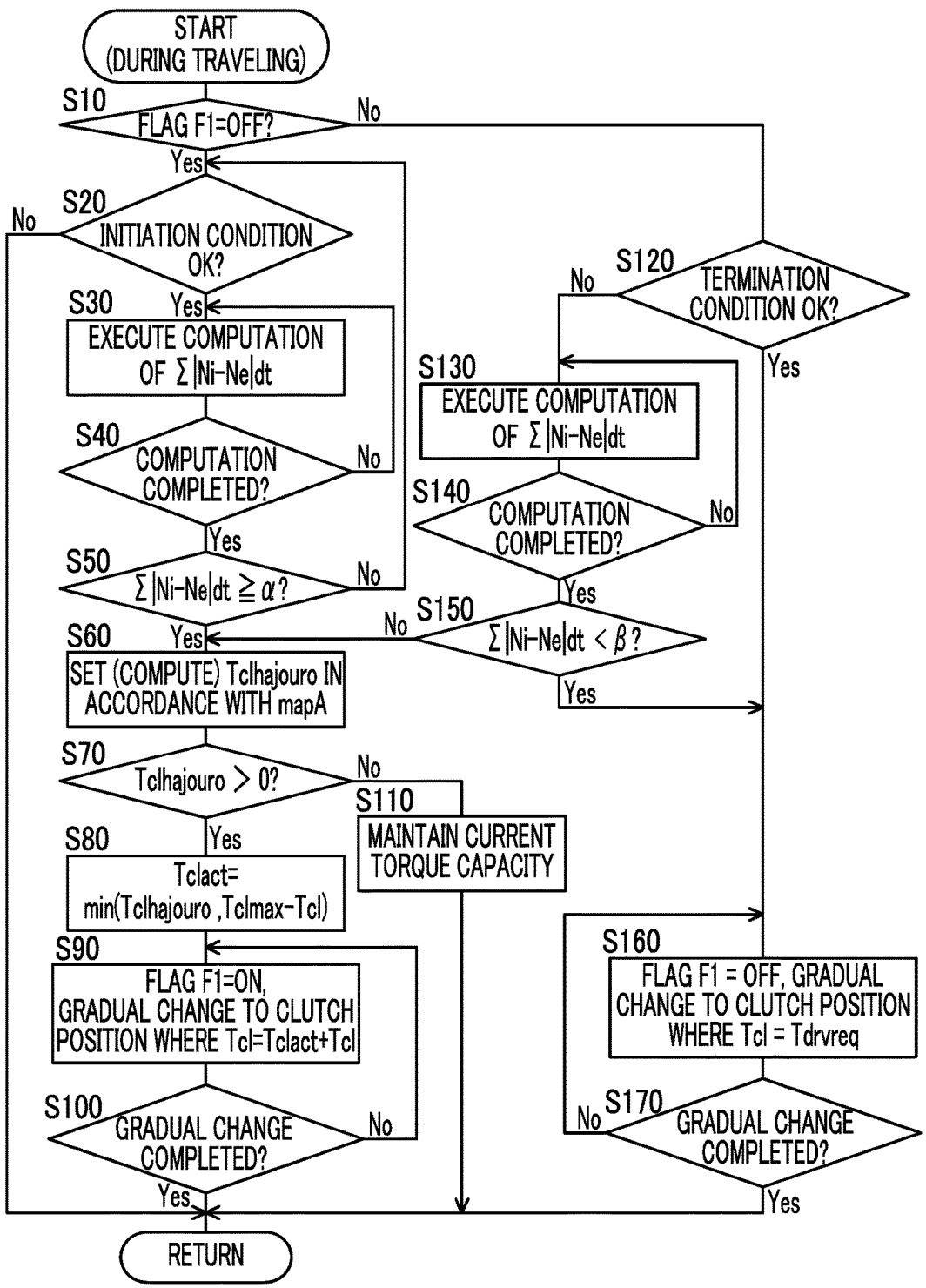

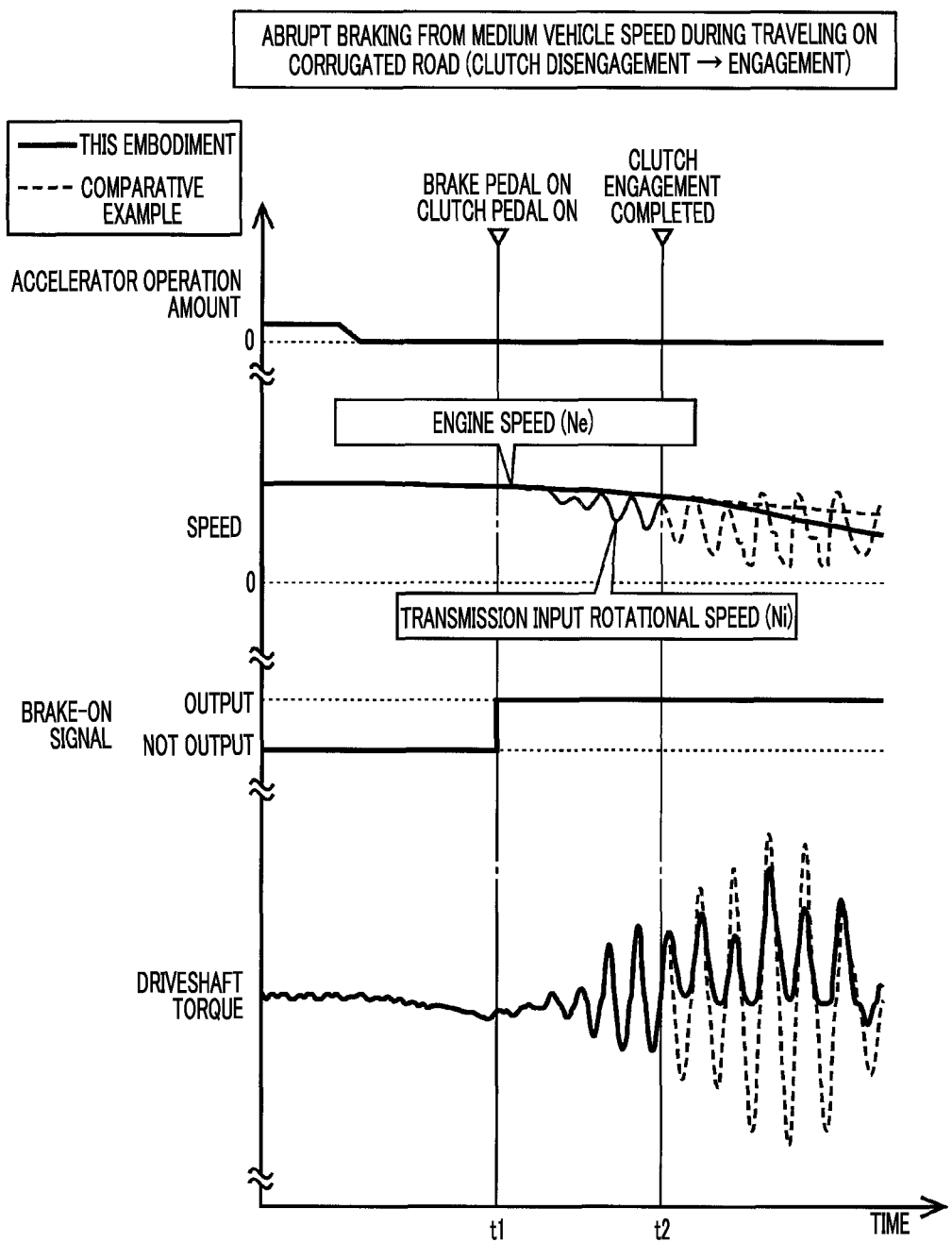

VEHICLE, CONTROLLER FOR VEHICLE, AND CONTROL METHOD FOR VEHICLE

INCORPORATION BY REFERENCE

The disclosure of Japanese Patent Application No. 2016-017543 filed on Feb. 1, 2016 including the specification, drawings and abstract is incorporated herein by reference in its entirety.

BACKGROUND

1. Technical Field

The invention relates to a vehicle, a controller for the vehicle, and a control method for the vehicle, the vehicle includes a clutch for connecting and disconnecting a power transmission route between an engine and a drive wheel and a clutch actuator for switching between engagement and disengagement of the clutch.

2. Description of Related Art

A controller of a power transmission apparatus for a vehicle has widely been known, the controller determining behavior (vibrations) of a vehicle body and suppressing the behavior. For example, a brake controller described in Japanese Patent Application Publication No. 2011-140303 (JP 2011-140303 A) is such a controller. This JP 2011-140303 A discloses that, when pitch behavior that raises a front section of the vehicle body is intensified, front-wheel brake means generates braking that corresponds to the pitch behavior. This causes forward movement of a load in the vehicle body. Depending on a shock absorber, the significant pitch behavior that brings a situation where suppression of pitch motion is difficult can be handled. In this way, the significant pitch behavior can be suppressed.

SUMMARY

By the way, there is a case where a vehicle travels on a corrugated road that has a wavy road surface, or the like. In such a case, the vehicle is brought into a travel state where a wheel repeatedly contacts and separates from the road surface. Thus, depending on a relationship between irregularity intervals of the corrugated road and a vehicle speed, a phenomenon called vibrations of unsprung mass possibly occurs. When a large braking force is applied to the wheel in such a travel state, a large wheel speed fluctuation (reduction) occurs to the wheel that separates from the road surface. Then, when the wheel contacts the road surface in such a travel state, friction against the road surface causes the wheel to rotate. Thus, large torque is applied to a driveshaft. When this is repeated, coupled vibrations with torsional resonance vibrations in a power transmission route between an engine and a drive wheel occur. Thus, transitional torsional torque as larger torque is possibly generated on the driveshaft. The transitional torsional torque, which is generated in the above-described structure, is a phenomenon caused by the vibrations of unsprung mass and is approximately 10 Hz. Meanwhile, when a brake actuator is hydraulically controlled as in the technique described in JP 2011-140303 A, a response frequency of the control is at most equal to 4 Hz. For this reason, the torsional torque cannot effectively be suppressed in wheel brake control. The continued application of the torsional torque to the driveshaft is not preferred from a perspective of durability of drive-system components. In particular, when the clutch, which is disposed in the power transmission route between the engine and the drive wheel, is disengaged, alternating torque of the torsional torque that fluctuates in both of a positive side and a negative side is repeatedly applied to the driveshaft. Accordingly, necessity of protecting the drive-system components is increased.

The disclosure provides a vehicle, a controller for the vehicle, and a control method for the vehicle capable of suppressing fluctuations in torsional torque generated in a power transmission route between a clutch and a drive wheel when a braking operation is performed during deceleration traveling.

A first aspect of the disclosure provides a vehicle. The vehicle includes an engine, a drive wheel, a clutch, a clutch actuator and an electronic control unit. The clutch is configured to connect and disconnect a power transmission route between the engine and the drive wheel. The clutch actuator is configured to switch between engagement and disengagement of the clutch. The electronic control unit is configured to switch an actuation state of the clutch by the clutch actuator. Further, the electronic control unit is configured to determine whether fluctuations in torsional torque generated in the power transmission route between the clutch and the drive wheel are larger than a specified value. Furthermore, the electronic control unit is configured to control the clutch so as to increase torque capacity of the clutch when the electronic control unit determines that the fluctuations in the torsional torque are larger than the specified value during deceleration traveling of the vehicle.

According to the vehicle, the electronic control unit controls the clutch so as to increase the torque capacity of the clutch in the case where the electronic control unit determines that the fluctuations in the torsional torque generated in the power transmission route between the clutch and the drive wheel are larger than the specified value when deceleration traveling. Thus, engine brake that corresponds to an increased amount of the torque capacity of the clutch is actuated. Therefore, the fluctuations in the torsional torque can be suppressed by the engine brake.

In the vehicle, the vehicle may include a transmission provided in the power transmission route between the clutch and the drive wheel. Further, the electronic control unit may be configured to determine whether the fluctuations in the torsional torque are larger than the specified value, based on a magnitude of fluctuation width of an input rotational speed of the transmission in a specified period.

In the vehicle, the electronic control unit may be configured to determine that the fluctuations in the torsional torque are larger than the specified value when an integral value of a speed difference between a speed of the engine and the input rotational speed of the transmission in the specified period is equal to or larger than a predetermined first determination value.

According to the vehicle, the electronic control unit determines whether the fluctuations in the torsional torque are larger than the specified value by using a speed difference between the speed of the engine and the input rotational speed of the transmission. The fluctuation width of the input rotational speed of the transmission is influenced by the fluctuations in the torsional torque, and the speed difference, to which the fluctuation width of the input rotational speed of the transmission is reflected, is used. Thus, the electronic control unit can appropriately determine whether the fluctuations in the torsional torque are larger than the specified value. Therefore, erroneous actuation of control for increasing the torque capacity of the clutch can be suppressed.

In the vehicle, the electronic control unit may be configured to determine whether the integral value of the speed difference between the speed of the engine and the input rotational speed of the transmission is smaller than a predetermined second determination value that is a smaller value than the first determination value. Further, the electronic control unit may be configured to terminate control for increasing the torque capacity of the clutch when the electronic control unit determines that the integral value is smaller than the second determination value.

According to the vehicle, the electronic control unit terminates the control for increasing the torque capacity of the clutch when the electronic control unit determines that the integral value of the speed difference between the speed of the engine and the input rotational speed of the transmission is smaller than the second determination value that is the smaller value than the first determination value. Therefore, the electronic control unit can terminate the control for increasing the torque capacity of the clutch in a state where the fluctuations in the torsional torque are less likely to be increased even when the control for increasing the torque capacity of the clutch is terminated.

In the vehicle, the electronic control unit may be configured to compute increased torque capacity of the torque capacity of the clutch, and the increased torque capacity may be required to suppress the fluctuations in the torsional torque. Further, the electronic control unit may be configured to switch the actuation state of the clutch by the clutch actuator such that driver requested torque capacity is obtained, the driver requested torque capacity may be a torque capacity of the clutch that corresponds to an operation of a clutch pedal by a driver. The electronic control unit may be configured to control the clutch so as to increase smaller torque capacity of the increased torque capacity and differential torque capacity between maximum torque capacity of the clutch and the driver requested torque capacity with respect to the driver requested torque capacity.

According to the vehicle, the electronic control unit controls the clutch so as to increase the smaller torque capacity of the increased torque capacity of the torque capacity of the clutch that is required to suppress the fluctuations in the torsional torque and the differential torque capacity between the maximum torque capacity of the clutch and the driver requested torque capacity that corresponds to the operation of the clutch pedal with respect to the driver requested torque capacity. Therefore, the fluctuations in the torsional torque can be suppressed while the actuation state of the clutch is switched in accordance with the operation of the clutch pedal by the driver.

In the vehicle, the electronic control unit may be configured to control the clutch actuator so as to engage the clutch when the electronic control unit determines that the fluctuations in the torsional torque are larger than the specified value when the clutch is disengaged during deceleration traveling of the vehicle.

According to the vehicle, the electronic control unit controls the clutch so as to engage the clutch in the case where the electronic control unit determines that the fluctuations in the torsional torque are larger than the specified value when the clutch is disengaged and the braking operation is performed during deceleration traveling. Therefore, engine brake is actuated, and the fluctuations in the torsional torque generated in the power transmission route between the clutch and the drive wheel can be suppressed.

A second aspect of the disclosure provides a controller for a vehicle. The vehicle includes an engine, a drive wheel, a clutch, a clutch actuator and an electronic control unit. The clutch is configured to connect and disconnect a power transmission route between the engine and the drive wheel. The clutch actuator is configured to switch between engagement and disengagement of the clutch. The electronic control unit is configured to switch an actuation state of the clutch by the clutch actuator. Further, the electronic control unit is configured to determine whether fluctuations in torsional torque generated in the power transmission route between the clutch and the drive wheel are larger than a specified value. Furthermore, the electronic control unit is configured to control the clutch so as to increase torque capacity of the clutch when the electronic control unit determines that the fluctuations in the torsional torque are larger than the specified value during deceleration traveling of the vehicle.

According to the controller, the electronic control unit controls the clutch so as to increase the torque capacity of the clutch in the case where the electronic control unit determines that the fluctuations in the torsional torque generated in the power transmission route between the clutch and the drive wheel are larger than the specified value when the braking operation is performed during deceleration traveling. Thus, the engine brake that corresponds to an increased amount of the torque capacity of the clutch is actuated. Therefore, the fluctuations in the torsional torque can be suppressed by the engine brake.

A third aspect of the disclosure provides a control method for a vehicle. The vehicle includes an engine, a drive wheel, a clutch, a clutch actuator and an electronic control unit. The clutch is configured to connect and disconnect a power transmission route between the engine and the drive wheel. The clutch actuator is configured to switch between engagement and disengagement of the clutch. The electronic control unit is configured to switch an actuation state of the clutch by the clutch actuator. Further, the electronic control unit is configured to determine whether fluctuations in torsional torque generated in the power transmission route between the clutch and the drive wheel are larger than a specified value. Further, the electronic control unit is configured to control the clutch so as to increase torque capacity of the clutch when the electronic control unit determines that the fluctuations in the torsional torque are larger than the specified value during deceleration traveling of the vehicle.

According to the control method, the electronic control unit controls the clutch so as to increase the torque capacity of the clutch in the case where the electronic control unit determines that the fluctuations in the torsional torque generated in the power transmission route between the clutch and the drive wheel are larger than the specified value when the braking operation is performed during deceleration traveling. Thus, the engine brake that corresponds to an increased amount of the torque capacity of the clutch is actuated. Therefore, the fluctuations in the torsional torque can be suppressed by the engine brake.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart for illustrating main sections of control actuation of an electronic control unit, that is, control actuation for suppressing fluctuations in the torsional torque generated in a power transmission route when a braking operation is performed during deceleration traveling; and FIG. 8 is one example of a time chart in the case where the control actuation, which is shown in the flowchart in FIG. 7, is executed.

DETAILED DESCRIPTION OF EMBODIMENTS

A detailed description will hereinafter be made on an embodiment of the disclosure with reference to the drawings.

Figure 1:
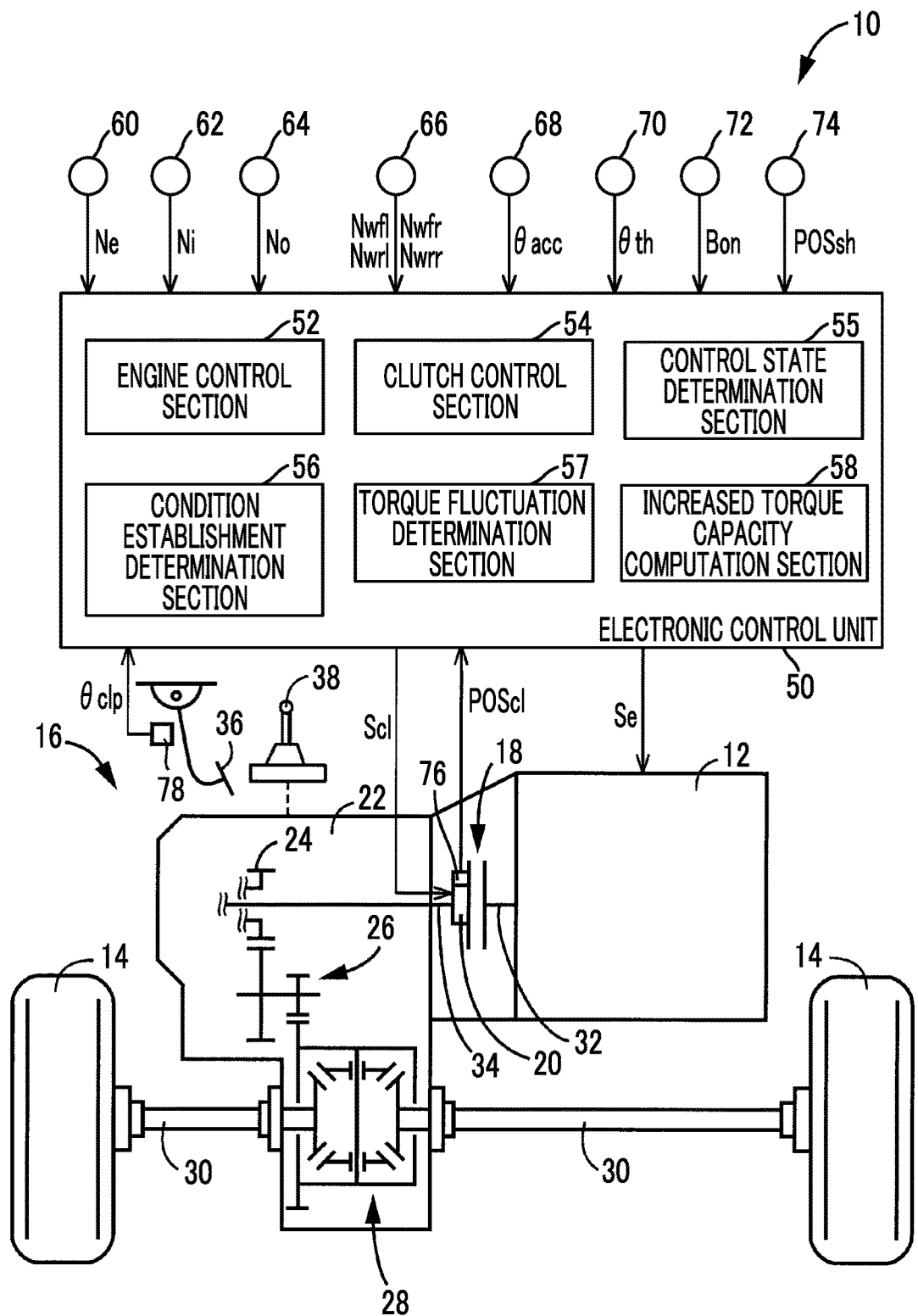
FIG. 1 is a view for illustrating a schematic configuration of a vehicle, to which the disclosure is applied, and is also a view for illustrating main sections of a control function and a control system for various types of control in the vehicle.

FIG. 1 is a view for illustrating a schematic configuration of a vehicle 10, to which the disclosure is applied, and is also a view for illustrating main sections of a control system for various types of control in the vehicle 10. In FIG. 1, the vehicle 10 includes an engine 12, drive wheels 14, and a power transmission apparatus 16 for a vehicle (hereinafter referred to as a power transmission apparatus 16) that is provided in a power transmission route between the engine 12 and the drive wheels 14. The power transmission apparatus 16 includes: a clutch 18 that connects and disconnects the power transmission route between the engine 12 and the drive wheels 14; a clutch actuator 20 that switches among engagement, slipping, and disengagement of the clutch 18; a transmission 22 that constitutes a part of the power transmission route between the clutch 18 and the drive wheels 14; a reduction gear mechanism 26 that is coupled to a transmission output gear 24 as an output rotary member of the transmission 22; a differential gear 28 that is coupled to the reduction gear mechanism 26; a pair of driveshafts (axles) 30 that is coupled to the differential gear 28; and the like. In the power transmission apparatus 16, power (torque and force are defined the same as the power unless otherwise distinguished) that is output from the engine 12 is transmitted to the drive wheels 14 sequentially through the clutch 18, the transmission 22, the reduction gear mechanism 26, the differential gear 28, the driveshafts 30, and the like.

The engine 12 is a drive power source of the vehicle 10 and is a known internal combustion engine such as a gasoline engine or a diesel engine. Engine torque Te of the engine 12 is controlled when operation states thereof, such as an intake air amount, a fuel supply amount, and ignition timing, are controlled by an electronic control unit 50, which will be described below.

The clutch 18 is a known friction clutch of a dry single plate type, for example. A release sleeve (not shown) thereof is moved when the clutch actuator 20 is driven by the electronic control unit 50, which will be described below. Then, an inner end of a diaphragm spring (not shown) is displaced, and an actuation state of the clutch 18 is thereby switched. In a state where the clutch actuator 20 does not move the release sleeve, the clutch 18 is engaged and connects the power transmission route between the engine 12 and the transmission 22. On the contrary, when the clutch actuator 20 moves the release sleeve in the clutch 18, the release sleeve presses an inner circumferential end of the diaphragm spring. In conjunction with this, an urging force of the diaphragm spring is reduced, and torque capacity Tcl of the clutch 18 is reduced. Then, once displacement of the release sleeve (that is, a clutch position POScl) reaches a specified amount, the clutch 18 is disengaged and disconnects (blocks) the power transmission route between the engine 12 and the transmission 22. Just as described, the clutch 18 is configured to connect and disconnect the power transmission route between the engine 12 and the transmission 22 (that is, the power transmission route between a crankshaft 32 of the engine 12 and a transmission input shaft 34 as an input rotary member of the transmission 22) when the actuation state thereof is switched by the clutch actuator 20.

The actuation state of the clutch 18 can be switched when the clutch actuator 20 is driven by the electronic control unit 50, which will be described below, based on a clutch pedal operation amount θclp. The clutch pedal operation amount θclp is an operation amount for which a clutch pedal 36, which is provided near a driver's seat of the vehicle 10, is depressed. When the clutch pedal 36 is depressed, the clutch 18 slips or is disengaged. Then, once depression of the clutch pedal 36 is canceled, the clutch 18 is engaged. Alternatively, regardless of the operation of the clutch pedal 36, the actuation state of the clutch 18 can be switched when the clutch actuator 20 is driven by the electronic control unit 50. For example, even when the clutch pedal 36 is not depressed, the release sleeve is moved by the clutch actuator 20, and the clutch 18 can thereby slip or be disengaged. The clutch actuator 20 is of an electric type or a hydraulic type, and the torque capacity Tcl of the clutch 18 is controlled in accordance with the displacement (that is, the clutch position POScl) of the release sleeve, which is changed by actuation of the clutch actuator 20.

The transmission 22 is, for example, a known manual transmission that includes plural pairs of constantly-meshing transmission gears between two shafts, and is provided in the power transmission route between the engine 12 and the drive wheels 14. The transmission 22 selectively establishes any one of a forward gear stage (for example, a fifth forward stage), a reverse gear stage (for example, a first reverse stage), and neutral by a manual operation of a shift lever 38 that is provided near the driver's seat in the vehicle 10. Just as described, the transmission 22 is a transmission capable of switching the gear stage by the manual operation.

The vehicle 10 includes the electronic control unit 50 that includes a controller of the power transmission apparatus 16, and the controller is associated with switching control of the actuation state of the clutch 18 and the like, for example. Thus, FIG. 1 is a diagram that shows an input and output system of the electronic control unit 50 and is a functional block diagram that illustrates main sections of a control function of the electronic control unit 50. The electronic control unit 50 is configured by including a so-called microcomputer that includes a CPU, a RAM, a ROM, input and output interfaces, and the like, for example. In the electronic control unit 50, the CPU processes a signal in accordance with a program that is stored in the ROM in advance while using a temporary storage function of the RAM. In this way, the electronic control unit 50 executes various types of control for the vehicle 10. For example, the electronic control unit 50 executes output control of the engine 12, the switching control of the clutch 18, and the like. The electronic control unit 50 is configured to be divided for the engine output control, the clutch control, and the like upon necessary.

The electronic control unit 50 is supplied with various actual values that are based on detection signals detected by various sensors provided in the vehicle 10. Note that the various sensors include an engine speed sensor 60, an input rotational speed sensor 62, an output rotational speed sensor 64, a wheel speed sensor 66 for each wheel, an accelerator operation amount sensor 68, a throttle valve opening degree sensor 70, a brake switch 72, a shift position sensor 74, a clutch position sensor 76, a clutch pedal sensor 78, and the like, for example. The various actual values include: an engine speed Ne that is a speed of the engine 12; a transmission input rotational speed Ni that is a rotational speed of the transmission input shaft 34; a transmission output rotational speed No that is a rotational speed of the transmission output gear 24; wheel speeds Nwfl, Nwfr, Nwrl, Nwrr that are respectively wheel speeds Nw of left and right front wheels (the drive wheels 14 in this embodiment) and left and right rear wheels (unillustrated driven wheels in this embodiment); an accelerator pedal operation amount θacc that is an operation amount of an accelerator pedal by a driver; a throttle valve opening degree θth that is an opening degree of an electronic throttle valve; brake-on Bon that is a signal indicative of a brake operation state where the driver operates a brake pedal to actuate wheel brakes; a shift position POSsh that is a signal indicative of an operation position of the shift lever 38; the clutch position POScl that is the displacement of the clutch 18; the clutch pedal operation amount θclp that is an operation amount (a depression amount) at a time when the driver depresses the clutch pedal 36; and the like, for example. The electronic control unit 50 outputs an engine output control command signal Se for the output control of the engine 12, a clutch control command signal Scl for the switching control of the actuation state of the clutch 18, and the like. This clutch control command signal Scl is a command signal that is used to move the release sleeve to the target clutch position POScl and is output to the clutch actuator 20, the release sleeve switching the actuation state of the clutch 18. Note that the electronic control unit 50 computes a vehicle speed V as one of the various actual values based on the wheel speeds Nw. For example, the electronic control unit 50 sets an average value of the wheel speeds Nw as the vehicle speed V. In addition, a front wheel speed Nwf is an average value of the wheel speeds Nwfl, Nwfr of the left and right front wheels, and a rear wheel speed Nwr is an average value of the wheel speeds Nwrl, Nwrr of the left and right rear wheels.

In order to realize the control function for the various types of the control in the vehicle 10, the electronic control unit 50 includes engine control means, that is, an engine control section 52 and clutch control means, that is, a clutch control section 54.

The engine control section 52 applies the accelerator pedal operation amount θacc to a relationship (for example, a throttle valve opening degree map) that is computed in an experiment or design and stored in advance (that is, predetermined), and thereby computes a target throttle valve opening degree θthtgt. The engine control section 52 executes the output control of the engine 12 by driving a throttle actuator and by outputting the engine output control command signal Se, which is used to actuate a fuel injector in accordance with the intake air amount and the like, so as to obtain the target throttle valve opening degree θthtgt.

Figure 2:
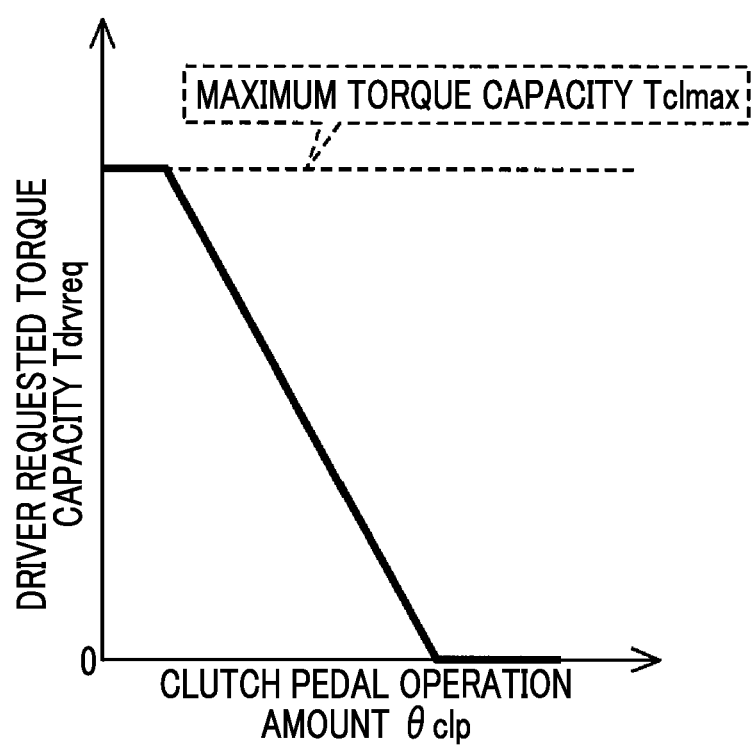
FIG. 2 is a graph that shows one example of a predetermined relationship between a clutch pedal operation amount and driver requested torque capacity of a clutch.

The clutch control section 54 outputs the clutch control command signal Scl that is used to switch the actuation state of the clutch 18 by the clutch actuator 20. More specifically, the clutch control section 54 can switch the actuation state of the clutch 18 by the clutch actuator 20 based on the operation of the clutch pedal 36. For example, the clutch control section 54 applies the clutch pedal operation amount θclp to a predetermined relationship (for example, a requested torque capacity map) between the clutch pedal operation amount θclp and driver requested torque capacity Tdrvreq as shown in FIG. 2 and thereby computes the driver requested torque capacity Tdrvreq of the clutch 18 in accordance with the clutch pedal operation amount θclp. The driver requested torque capacity Tdrvreq is torque capacity of the clutch 18 that corresponds to an operation of the clutch pedal 36 by the driver. The clutch control section 54 applies the driver requested torque capacity Tdrvreq to a predetermined relationship (for example, a clutch characteristic map) between the clutch position POScl and the torque capacity Tcl of the clutch 18 and thereby computes the clutch position POScl at which the driver requested torque capacity Tdrvreq can be obtained. The clutch control section 54 outputs the clutch control command signal Scl, which is used to control the clutch position POScl, to the clutch actuator 20 such that the clutch 18 is moved to the clutch position POScl, at which the driver requested torque capacity Tdrvreq can be obtained. Just as described, the clutch control section 54 switches the actuation state of the clutch 18 by the clutch actuator 20 so as to obtain the driver requested torque capacity Tdrvreq of the clutch 18 that corresponds to the operation of the clutch pedal 36 by the driver. In other words, the clutch control section 54 switches the actuation state of the clutch 18 by the clutch actuator 20 so as to bring the clutch 18 into any of engaged, slipping, and disengaged states in accordance with the clutch pedal operation amount θclp. Note that maximum torque capacity Tclmax is a maximum value of the torque that can be transmitted by the clutch 18 in FIG. 2. The maximum torque capacity Tclmax also corresponds to the torque capacity Tcl in such a state where the clutch actuator 20 is not actuated, the clutch position POScl is zero, and the clutch 18 is engaged.

In addition, the clutch control section 54 can switch the actuation state of the clutch 18 by the clutch actuator 20 regardless of the operation of the clutch pedal 36. For example, engine brake is actuated during traveling in which the gear stage of the transmission 22 is established. In such a travel state, the clutch control section 54 outputs the clutch control command signal Scl to the clutch actuator 20, the clutch control command signal Scl being used to control the clutch position POScl so as to disengage the clutch 18. The travel state where the engine brake is actuated is, for example, a travel state where none of the accelerator pedal, the brake pedal, and the clutch pedal 36 is depressed and thus is in an off state. In other words, the above travel state is a travel state where the accelerator pedal operation amount θacc is zero, the brake-on Bon signal is not output, and the clutch pedal operation amount θclp is zero.

By the way, when the vehicle 10 travels on a corrugated road or the like, the vehicle 10 is brought into a travel state where the drive wheel 14 repeatedly contacts and separates from a road surface. Depending on a relationship between irregularity intervals of the corrugated road and the vehicle speed V, a phenomenon called vibrations of unsprung mass possibly occurs. When a large braking force is applied to the drive wheel 14 in such a travel state, the wheel speed Nw of the drive wheel 14 that separates from the road surface is reduced to be lower than a wheel speed that corresponds to the actual vehicle speed V. Then, when the drive wheel 14 contacts the road surface in such a travel state, the road surface causes the drive wheel 14 to forcibly rotate. As a result, large torque is applied to the driveshaft 30. When the state where the wheel speed Nw of the drive wheel 14 is reduced to be lower than the wheel speed corresponding to the actual vehicle speed V and the state where the large torque is applied to the driveshaft 30 are repeated, coupled vibrations with torsional resonance vibrations in the power transmission route between the engine 12 and the drive wheels 14 occur. Thus, transitional torsional torque as larger torque is possibly generated on the driveshaft 30.

Figure 3:
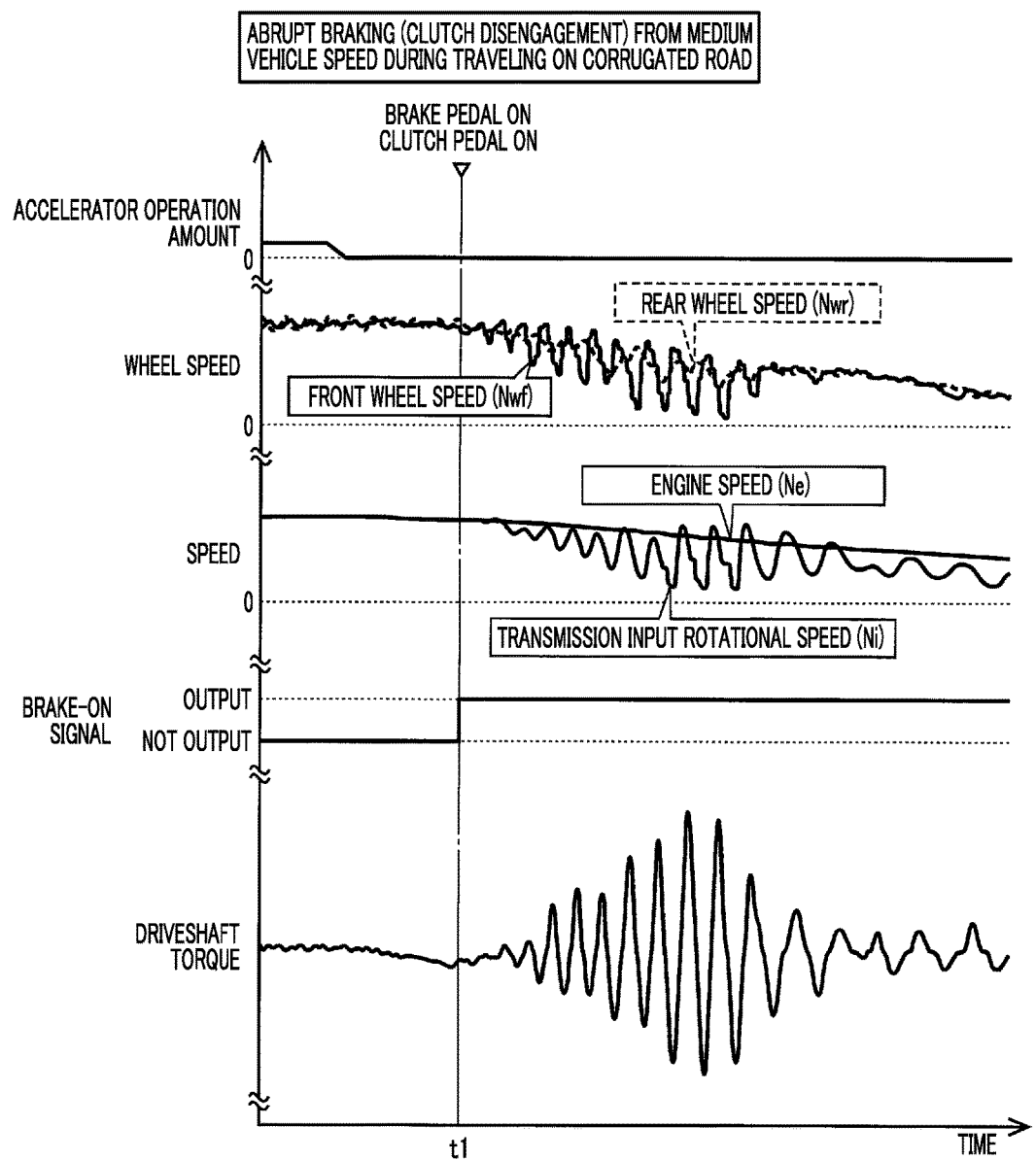
FIG. 3 is a chart that shows one example of torsional torque that is generated on a driveshaft in a case where the clutch is disengaged and abrupt braking occurs during traveling on a corrugated road at a medium vehicle speed.
Figure 4:
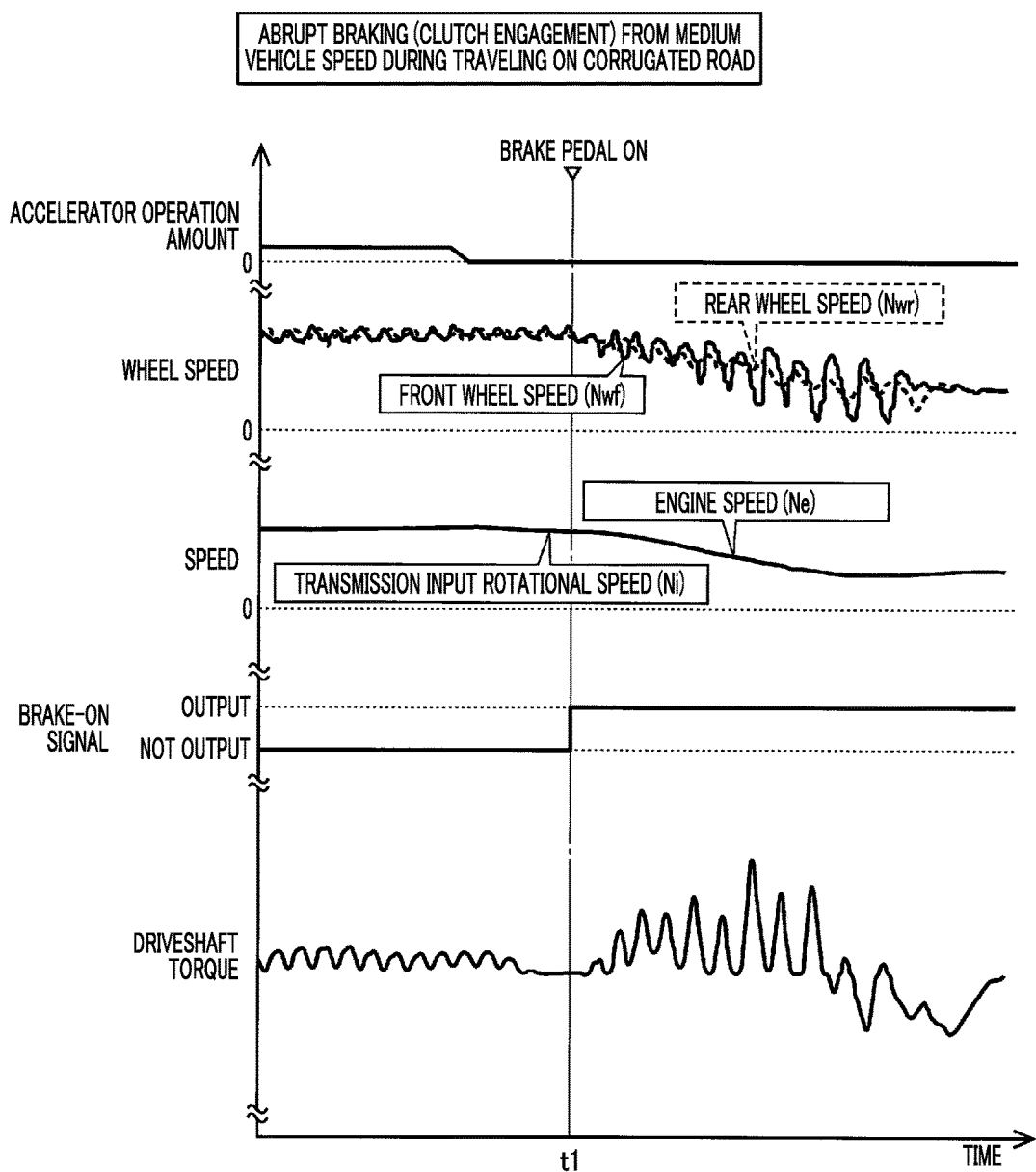
FIG. 4 is a chart that shows one example of the torsional torque that is generated on the driveshaft in a case where the clutch is engaged and the abrupt braking occurs during traveling on the corrugated road at the medium vehicle speed.
Figure 5:
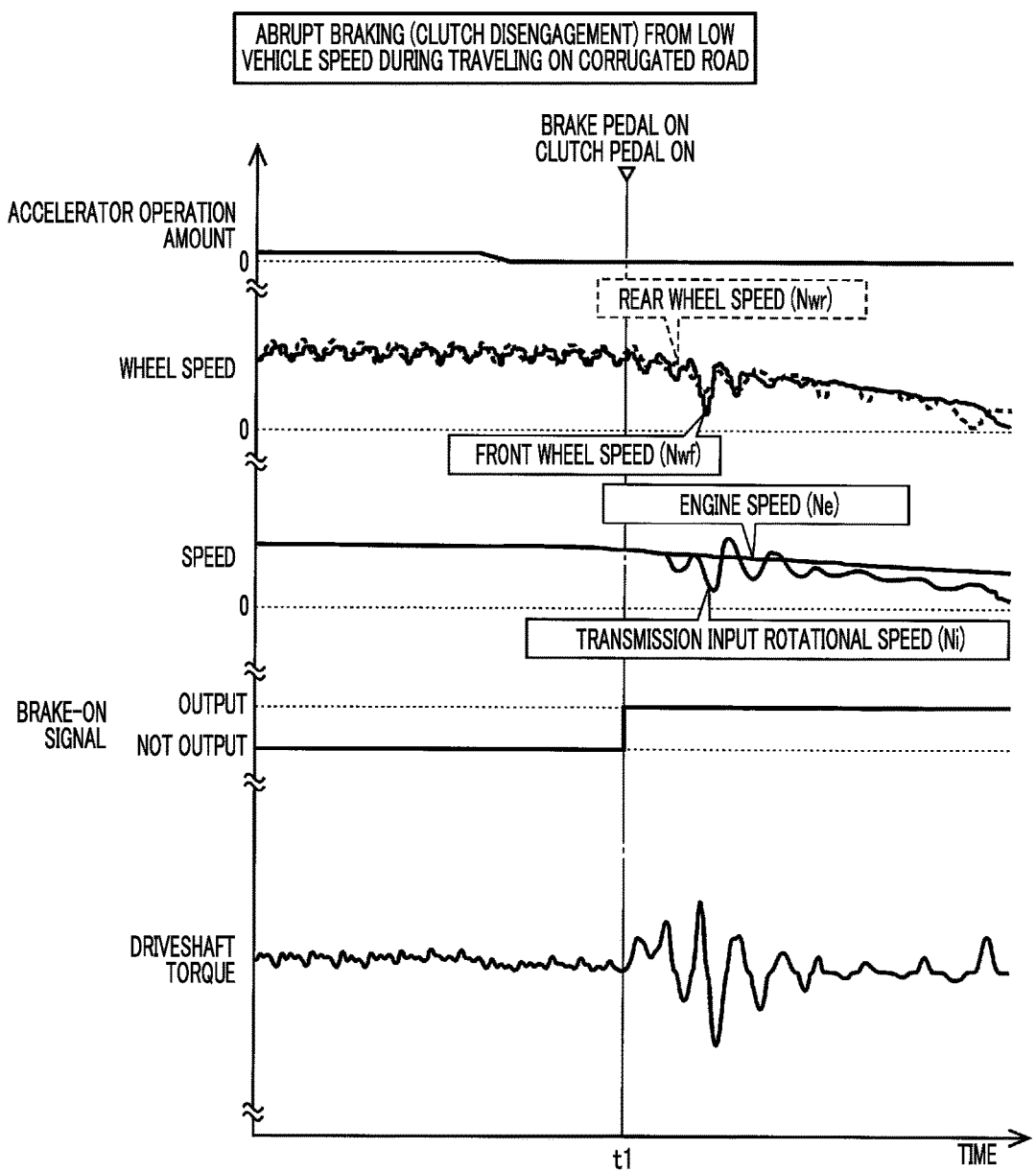
FIG. 5 is a chart that shows one example of the torsional torque that is generated on the driveshaft in a case where the clutch is disengaged and the abrupt braking occurs during traveling on the corrugated road at a low vehicle speed.

Each of FIG. 3, FIG. 4, and FIG. 5 is a chart that shows one example of the torsional torque that is generated on the driveshaft 30 in conjunction with abrupt braking during traveling on the corrugated road. FIG. 3 shows a case where the clutch 18 is disengaged and the abrupt braking occurs during traveling on the corrugated road at a medium vehicle speed. FIG. 4 shows a case where the clutch 18 remains engaged and the abrupt braking occurs during traveling on the corrugated road at the medium vehicle speed. FIG. 5 shows a case where the clutch 18 is disengaged and the abrupt braking occurs during traveling on the corrugated road at a low vehicle speed. In each of FIG. 3, FIG. 4, and FIG. 5, at a time point t1, at which the brake is on, onward, fluctuations in each of the wheel speeds Nw are increased due to the vibrations of the unsprung mass that occur in conjunction with repeated contact with the road surface and spinning in idle of the wheel. When the braking force is large, the larger braking force is usually distributed to the front wheels than to the rear wheels. Thus, the fluctuations in the front wheel speed Nwf are larger than the fluctuations in the rear wheel speed Nwr. In addition, when FIG. 3 and FIG. 4, each of which shows the abrupt braking at the same medium vehicle speed, are compared, it is understood that the torque generated on the driveshaft 30 is larger in a disengaged state of the clutch 18 than in an engaged state of the clutch 18. This is because the engine brake is not actuated in the disengaged state of the clutch 18. In particular, as shown in FIG. 3 and FIG. 5, when the clutch 18 is disengaged, alternating torque is repeatedly applied to the driveshaft 30, the alternating torque being the torsional torque that fluctuates in both of a positive side and a negative side. Thus, from a perspective of durability of drive-system components that constitute the power transmission route between the engine 12 and the drive wheels 14, the durability is more likely to be degraded in the state where the clutch 18 is disengaged than in the state where the clutch 18 is engaged. Furthermore, when FIG. 3 and FIG. 5, each of which shows the abrupt braking in the state where the clutch 18 is disengaged, are compared, it is understood that a correlative relationship is established between a magnitude of the torque fluctuations generated on the driveshaft 30 and fluctuation width of the transmission input rotational speed Ni. Thus, based on the fluctuation width of the transmission input rotational speed Ni, a magnitude of the fluctuations in the torsional torque can be estimated to some extent.

Accordingly, in the case where the fluctuations in (that is, vibration width of) the torsional torque generated in the power transmission route between the engine 12 and the drive wheels 14 are large when a braking operation is performed during deceleration traveling, the electronic control unit 50 (particularly, the clutch control section 54) controls the clutch 18 by the clutch actuator 20 so as to increase the torque capacity Tcl of the clutch 18.

In order to realize the above-described control for increasing the torque capacity Tcl of the clutch 18 (hereinafter referred to as torque capacity increase control), the electronic control unit 50 further includes control state determination means, that is, a control state determination section 55, condition establishment determination means, that is, a condition establishment determination section 56, torque fluctuation determination means, that is, a torque fluctuation determination section 57, and increased torque capacity computation means, that is, an increased torque capacity computation section 58.

A flag F1 indicates whether the torque capacity increase control by the clutch control section 54 is currently executed. The control state determination section 55 determines whether the flag F1 is in an off state that indicates the torque capacity increase control is not currently executed. The control state determination section 55 also determines whether increased torque capacity Tclhajouro that is computed by the increased torque capacity computation section 58 exceeds zero. The control state determination section 55 further determines whether the clutch 18 has been changed (for example, gradually changed) to the clutch position POScl, at which the target torque capacity Tcl is obtained, by the clutch control section 54.

When the control state determination section 55 determines that the flag F1 is in the off state, the condition establishment determination section 56 determines whether an initiation condition is established, the initiation condition being predetermined to initiate the torque capacity increase control by the clutch control section 54. When the control state determination section 55 determines that the flag F1 is not in the off state, the condition establishment determination section 56 determines whether a termination condition is established, the termination condition being predetermined to terminate the torque capacity increase control. That is, when it is determined that the flag F1 is in the on state that indicates the torque capacity increase control is currently executed by the clutch control section 54, the condition establishment determination section 56 determines whether the predetermined termination condition for terminating the torque capacity increase control is established.

The initiation condition includes an off state where the accelerator pedal is not depressed, an on state where the brake pedal is depressed, and a travel state where any of the gear stages and neutral of the transmission 22 is selected by the shift lever 38. That is, the above travel state is a travel state where the shift lever 38 is not in a transitional state where the shift lever 38 is currently operated. Thus, the initiation condition is a travel state where all of accelerator pedal off (or accelerator off) where the accelerator pedal operation amount θacc is zero (that is, the accelerator pedal operation amount θacc is lower than a value that is used to determine the accelerator off), brake pedal on (or brake on) where the signal of the brake-on Bon is output, and a state where the shift position POSsh is not unstable (that is, a signal indicative of the certain shift position POSsh is output) are established. Meanwhile, the termination condition includes a travel state where the initiation condition is not satisfied, for example, a travel state where the accelerator pedal is in the on state where the accelerator pedal is depressed, a travel state where the brake pedal is in the off state where the brake pedal is not depressed, or a state where none of the gear stages and the neutral state of the transmission 22 is selected by the shift lever 38 (that is, the transitional state where the shift lever 38 is currently operated). Thus, the termination condition is a travel state where at least one of the accelerator pedal on (or the accelerator on) in which the accelerator pedal operation amount θacc is not zero, brake pedal off (or brake off) where the signal of the brake-on Bon is not output, and a state where the shift position POSsh is unstable is established.

The torque fluctuation determination section 57 determines whether the fluctuations in the torsional torque generated in the power transmission route between the clutch 18 and the drive wheels 14 are larger than a specified value. This specified value is a value that is predetermined to determine the large fluctuations in the torsional torque that are not preferred in terms of the durability of the drive-system components constituting the power transmission route between the engine 12 and the drive wheels 14, for example. More specifically, when the condition establishment determination section 56 determines that the initiation condition of the torque capacity increase control is established, the torque fluctuation determination section 57 computes an integral value Ini (=Σ|Ni−Ne|dt) of a speed difference ΔNi (=|Ni−Ne|) between the engine speed Ne and the transmission input rotational speed Ni in a specified period. After the computation of the integral value Ini is completed, the torque fluctuation determination section 57 determines whether the fluctuations in the torsional torque are larger than the specified value based on whether the integral value Ini is equal to or larger than a first determination value α. The speed difference ΔNi is a numerical value indicative of the fluctuation width of the transmission input rotational speed Ni. The specified period is a predetermined period that is used to prevent erroneous determination on whether the fluctuations in the torsional torque are larger than the specified value, for example. The specified period may be a time period that corresponds to a few cycles (for example, two to three cycles) of the torsional torque. The first determination value α is a predetermined value that is used to determine that the fluctuations in the torsional torque are larger than the specified value, for example.

When the condition establishment determination section 56 determines that the termination condition of the torque capacity increase control is not established, the torque fluctuation determination section 57 computes the integral value Ini. After the computation of the integral value Ini is completed, the torque fluctuation determination section 57 determines whether the integral value Ini is smaller than a second determination value β. The second determination value β is a value that is predetermined to be a smaller value than the first determination value α. As will be described below, when the integral value Ini becomes smaller than the second determination value β, the clutch control section 54 terminates the torque capacity increase control. Thus, a fact that the integral value Ini is smaller than the second determination value β can be regarded as one of the several termination conditions. The reason why the second determination value β is used instead of the first determination value α to determine the termination of the torque capacity increase control is to prevent or suppress hunting of the torque capacity increase control. Thus, the second determination value β is a predetermined value that is used to determine the integral value Ini becomes small enough so that the integral value Ini does not become equal to or larger than the first determination value α even when the torque capacity increase control is terminated, for example.

Figure 6:
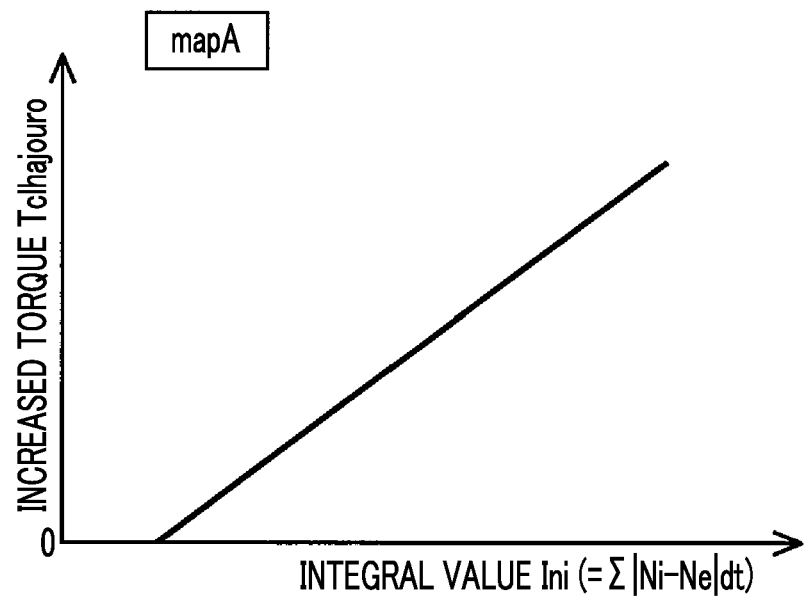
FIG. 6 is a graph that shows one example of a predetermined relationship between an integral value of a speed difference between a speed of an engine and an input rotational speed of a transmission and increased torque capacity of the torque capacity of the clutch.

The increased torque capacity computation section 58 computes the increased torque capacity Tclhajouro that is the torque capacity of the clutch 18 required to suppress the fluctuations in the torsional torque. More specifically, when the torque fluctuation determination section 57 determines that the fluctuations in the torsional torque are larger than the specified value, or when the torque fluctuation determination section 57 determines that the integral value Ini is not smaller than the second determination value β, the increased torque capacity computation section 58 applies the integral value Ini to a predetermined relationship (for example, an increased torque capacity map mapA) between the integral value Ini and the increased torque capacity Tclhajouro as shown in FIG. 6 and thereby computes the increased torque capacity Tclhajouro.

When the control state determination section 55 determines that the increased torque capacity Tclhajouro exceeds zero, the increased torque capacity computation section 58 computes differential torque capacity ΔTcl (=Tclmax−current Tcl) between the maximum torque capacity Tclmax of the clutch 18 and the current torque capacity Tcl of the clutch 18. This differential torque capacity ΔTcl corresponds to a maximum value of an increased amount of the torque capacity Tcl that can be increased from the current torque capacity Tcl of the clutch 18. Thus, the increased torque capacity computation section 58 sets a smaller value of the increased torque capacity Tclhajouro and the differential torque capacity ΔTcl as torque capacity (hereinafter referred to as actually increased torque capacity) Tclact (=min(Tclhajouro, ΔTcl)) that is actually increased. Here, the case where the torque fluctuation determination section 57 determines that the fluctuations in the torsional torque are larger than the specified value corresponds to the off state of the flag F1. Accordingly, the current torque capacity Tcl of the clutch 18 is the torque capacity Tcl at a time when the torque capacity increase control is not executed, and is also the driver requested torque capacity Tdrvreq of the clutch 18 that corresponds to the clutch pedal operation amount θclp. Thus, when the torque fluctuation determination section 57 determines that the fluctuations in the torsional torque are larger than the specified value, the increased torque capacity computation section 58 sets a smaller value of the increased torque capacity Tclhajouro and the differential torque capacity ΔTcl (=Tclmax−Tdrvreq) between the maximum torque capacity Tclmax and the driver requested torque capacity Tdrvreq as the actually increased torque capacity Tclact (=min(Tclhajouro, Tclmax−Tdrvreq)).

When the torque fluctuation determination section 57 determines that the fluctuations in the torsional torque are larger than the specified value, or when the torque fluctuation determination section 57 determines that the integral value Ini is not smaller than the second determination value β, the clutch control section 54 sets a value that is obtained by adding the actually increased torque capacity Tclact to the current torque capacity Tcl of the clutch 18 as the target torque capacity Tcl (=Tclact+current Tcl) of the clutch 18. Then, the clutch control section 54 executes the torque capacity increase control by outputting the clutch control command signal Scl, which is used to control the clutch position POScl, to the clutch actuator 20 such that the clutch 18 is moved to the clutch position POScl, at which the target torque capacity Tcl can be obtained. When executing the torque capacity increase control, the clutch control section 54 controls the clutch 18 by the clutch actuator 20 such that the clutch position POScl is gradually changed at a specified speed. In addition, when the flag F1 is in the off state during the execution of the torque capacity increase control, the clutch control section 54 brings the flag F1 into the on state.

As described above, when the torque fluctuation determination section 57 determines that the fluctuations in the torsional torque are larger than the specified value, the current torque capacity Tcl of the clutch 18 is the driver requested torque capacity Tdrvreq. Thus, when the torque fluctuation determination section 57 determines that the fluctuations in the torsional torque are larger than the specified value, the clutch control section 54 sets a value that is obtained by adding the actually increased torque capacity Tclact to the driver requested torque capacity Tdrvreq as the target torque capacity Tcl (=Tclact+Tdrvreq) of the clutch 18. Then, the clutch control section 54 executes the torque capacity increase control by outputting the clutch control command signal Scl, which is used to control the clutch position POScl, to the clutch actuator 20 such that the clutch 18 is moved to the clutch position POScl, at which the target torque capacity Tcl can be obtained. As described above, the clutch control section 54 controls the clutch 18 by the clutch actuator 20 so as to increase the actually increased torque capacity Tclact (=min(Tclhajouro, Tclmax−Tdrvreq)), which is the smaller torque capacity of the increased torque capacity Tclhajouro and the differential torque capacity ΔTcl (=Tclmax−Tdrvreq) between the maximum torque capacity Tclmax and the driver requested torque capacity Tdrvreq, with respect to the driver requested torque capacity Tdrvreq.

In the case where the control state determination section 55 determines that the increased torque capacity Tclhajouro does not exceed zero even when the torque fluctuation determination section 57 determines that the fluctuations in the torsional torque are larger than the specified value, or when the torque fluctuation determination section 57 determines that the integral value Ini is not smaller than the second determination value β, the clutch control section 54 controls the clutch 18 by the clutch actuator 20 so as to maintain the current torque capacity Tcl of the clutch 18.

On the contrary, when the condition establishment determination section 56 determines that the termination condition of the torque capacity increase control is established, or when the torque fluctuation determination section 57 determines that the integral value Ini is smaller than the second determination value β, the clutch control section 54 terminates the torque capacity increase control. More specifically, the clutch control section 54 sets the driver requested torque capacity Tdrvreq as the target torque capacity Tcl of the clutch 18. Then, the clutch control section 54 outputs the clutch control command signal Scl, which is used to control the clutch position POScl, to the clutch actuator 20 such that the clutch 18 is moved to the clutch position POScl, at which the target torque capacity Tcl can be obtained. In this way, the torque capacity increase control is terminated. When terminating the torque capacity increase control, the clutch control section 54 controls the clutch 18 by the clutch actuator 20 such that the clutch position POScl is gradually changed at the specified speed. In addition, when terminating the torque capacity increase control, the clutch control section 54 brings the flag F1 into the off state.

FIG. 7 is main sections of control actuation of the electronic control unit 50. That is, FIG. 7 is a flowchart for illustrating control actuation for suppressing the fluctuations in the torsional torque generated in the power transmission route between the clutch 18 and the drive wheels 14 when the braking operation is performed during deceleration traveling. The flowchart is repeatedly executed during traveling of the vehicle 10, for example. FIG. 8 is one example of a time chart in the case where the control actuation, which is shown in the flowchart in FIG. 7, is executed.

In FIG. 7, initially in step (hereinafter step is omitted) S10 that corresponds to a function of the control state determination section 55, it is determined whether the flag F1 is in the off state. If the determination of this S10 is positive, it is determined in S20 that corresponds to a function of the condition establishment determination section 56 whether the initiation condition for initiating the torque capacity increase control is established. If the determination of this S20 is negative, this routine is terminated. If the determination of this S20 is positive, in S30, S40, and S50 that correspond to a function of the torque fluctuation determination section 57, the integral value Ini (=∫|Ni−Ne|dt) of the speed difference ΔNi (=|Ni−Ne|) in the specified period is computed (S30), and it is determined whether the computation of the integral value Ini is completed (S40). The computation is executed until the torque fluctuation determination section 57 determines that the computation is completed (S30). Then, if the torque fluctuation determination section 57 determines that the computation is completed, it is determined whether the fluctuations in the torsional torque are larger than the specified value based on whether the integral value Ini is equal to or larger than the first determination value α (S50). If the determination of S50 is negative, the process returns to S20. If the determination of S50 is positive, in S60 that corresponds to a function of the increased torque capacity computation section 58, the integral value Ini is applied to the increased torque capacity map mapA as shown in FIG. 6. In this way, the increased torque capacity Tclhajouro is set (computed). Next, in S70 that corresponds to the function of the control state determination section 55, it is determined whether the increased torque capacity Tclhajouro exceeds zero. If the determination of this S70 is positive, in S80 that corresponds to the function of the increased torque capacity computation section 58, the smaller value of the increased torque capacity Tclhajouro and the differential torque capacity ΔTcl (=Tclmax−current Tcl) is set as the actually increased torque capacity Tclact (=min(Tclhajouro, ΔTcl)). Next, in S90 that corresponds to a function of the clutch control section 54, the flag F1 is brought into the on state, and the value that is obtained by adding the actually increased torque capacity Tclact to the current torque capacity Tcl of the clutch 18 is set as the target torque capacity Tcl (=Tclact+current Tcl) of the clutch 18. Then, the clutch position is gradually changed to the clutch position POScl, at which the target torque capacity Tcl can be obtained. Next, in S100 that corresponds to the function of the control state determination section 55, it is determined whether the gradual change to the clutch position POScl, at which the target torque capacity Tcl of the clutch 18 can be obtained, is completed. If the determination of S100 is negative, the process returns to S90. If the determination of S100 is positive, this routine is terminated. If the determination of S70 is negative, in S110 that corresponds to the function of the clutch control section 54, the current torque capacity Tcl of the clutch 18 is maintained. On the other hand, if the determination of S10 is negative, it is determined in S120 that corresponds to the function of the condition establishment determination section 56 whether the termination condition for terminating the torque capacity increase control is established. If the determination of S120 is negative, in S130, S140, and S150 that correspond to the function of the torque fluctuation determination section 57, the integral value Ini (=Σ|Ni−Ne|dt) of the speed difference ΔNi (=|Ni−Ne|) in the specified period is computed (S130), and it is determined whether the computation of the integral value Ini is completed (S140). Next, the computation is executed until the torque fluctuation determination section 57 determines that the computation is completed (S130). Then, if the torque fluctuation determination section 57 determines that the computation is completed, it is determined whether the integral value Ini is smaller than the second determination value β (S150). If the determination of S150 is negative, the process in S60 onward is executed. If the determination of S120 is positive, or if the determination of S150 is positive, in S160 that corresponds to the function of the clutch control section 54, the flag F1 is brought into the off state, and the driver requested torque capacity Tdrvreq is set as the target torque capacity Tcl (=Tdrvreq) of the clutch 18. Then, the clutch position is gradually changed to the clutch position POScl, at which the target torque capacity Tcl can be obtained. Next, in S170 that corresponds to the function of the control state determination section 55, it is determined whether the gradual change to the clutch position POScl, at which the target torque capacity Tcl of the clutch 18 can be obtained, is completed. If the determination of S170 is negative, the process returns to S160. If the determination of S170 is positive, this routine is terminated. Note that when S80 and S90 are executed due to the positive determination of S50, the current torque capacity Tcl (current Tcl) of the clutch 18 is the driver requested torque capacity Tdrvreq. In addition, when S90 is executed due to the negative determination of S150, the flag F1 is already in the on state, and thus the on state is maintained as is.

In FIG. 8, the time point t1 indicates a time point at which the clutch pedal 36 is depressed and the brake pedal is on during traveling on the corrugated road at the medium vehicle speed. At the time point t1, at which the brake is on, onward, the torsional torque is generated on the driveshaft 30. In a comparative example that is indicated by a broken line, the clutch 18 remains in the disengaged state at the time point t1 onward. Thus, the alternating torque is repeatedly applied to the driveshaft 30. On the other hand, in this embodiment that is indicated by a solid line, the clutch 18 is engaged when the integral value Ini of the speed difference ΔNi (=|Ni−Ne|) in the specified period becomes equal to or larger than the first determination value α. Thus, at a time point t2, at which the engagement of the clutch 18 is completed, onward, the engine brake is actuated. Thus, the fluctuations in (the vibration width of) the torsional torque that is applied to the driveshafts 30 are reduced. In this embodiment shown in FIG. 8, the torque capacity increase control is executed by engaging the disengaged clutch 18. That is, in the case where it is determined that the fluctuations in the torsional torque are larger than the specified value when the clutch 18 is disengaged and the braking operation is performed during deceleration traveling, the clutch control section 54 controls the clutch 18 by the clutch actuator 20 so as to engage the clutch 18. In this case, the increased torque capacity Tclhajouro as-is is set as the target torque capacity Tcl of the clutch 18. In this way, the engagement of the disengaged clutch 18 is one aspect of the torque capacity increase control.

As described above, according to this embodiment, in the case where the fluctuations in the torsional torque generated in the power transmission route between the clutch 18 and the drive wheels 14 are larger than the specified value when the braking operation is performed during deceleration traveling, the clutch 18 is controlled so as to increase the torque capacity Tcl of the clutch 18. Thus, the engine brake whose magnitude corresponds to the increased amount of the torque capacity Tcl of the clutch 18 is actuated. Therefore, the fluctuations in (the vibration width of) the torsional torque can be suppressed by the engine brake.

According to this embodiment, the speed difference ΔNi (=|Ni−Ne|), to which the fluctuation width of the transmission input rotational speed Ni is reflected, is used, the fluctuation width of the transmission input rotational speed Ni being influenced by the fluctuations in the torsional torque. Thus, it is possible to appropriately determine whether the fluctuations in the torsional torque are larger than the specified value. Therefore, erroneous actuation of the torque capacity increase control can be suppressed.

According to this embodiment, when the integral value Ini of the speed difference ΔNi is smaller than the second determination value β, which is the smaller value than the first determination value α, the torque capacity increase control is terminated. Thus, the torque capacity increase control can be terminated in such a state where the fluctuations in the torsional torque are less likely to be increased even when the torque capacity increase control is terminated.

According to this embodiment, the clutch 18 is controlled so as to increase the smaller torque capacity (that is, the actually increased torque capacity Tclact) of the increased torque capacity Tclhajouro, which is required to suppress the fluctuations in the torsional torque, and the differential torque capacity ΔTcl (=the maximum torque capacity Tcl-max−the driver requested torque capacity Tdrvreq) with respect to the driver requested torque capacity Tdrvreq. Thus, the fluctuations in the torsional torque can be suppressed while the actuation state of the clutch 18 is switched in accordance with the operation of the clutch pedal 36 by the driver.

According to this embodiment, in the case where the fluctuations in the torsional torque are larger than the specified value when the clutch 18 is disengaged and the braking operation is performed during deceleration traveling, the clutch 18 is controlled such that the clutch 18 is engaged. Thus, the engine brake is actuated, and the fluctuations in the torsional torque can thereby be suppressed.

The embodiment of the disclosure has been described in detail so far based on the drawings. However, the disclosure is also applied to other aspects.

For example, in the above-described embodiment, the disengagement of the clutch 18 in the embodiment shown in FIG. 8 corresponds to the state where the clutch 18 is disengaged by the depression of the clutch pedal 36. However, the disengagement of the clutch 18 in the embodiment also includes the state where the clutch 18 is disengaged by disengagement control of the clutch 18, which is executed in such a travel state where the engine brake is actuated during traveling in which the gear stage of the transmission 22 is established, for example. In such a case, the torque capacity increase control can also be executed.

In the above-described embodiment, after it is determined that the initiation condition for initiating the torque capacity increase control is established, or after it is determined that the termination condition for terminating the torque capacity increase control is not established, the computation of the integral value Ini of the speed difference ΔNi in the specified period is executed (initiated). However, the disclosure is not limited to this aspect. For example, the integral value Ini may constantly be computed during traveling. In such a case, steps S30, S40, S130, and S140 in the flowchart in FIG. 7 may not be provided. In addition, it is determined whether the fluctuations in the torsional torque are larger than the specified value based on whether the integral value Ini of the speed difference ΔNi in the specified period is equal to or larger than the first determination value α. However, the disclosure is not limited to this aspect. For example, the fluctuation width of the transmission input rotational speed Ni may be computed, and it may be determined whether the fluctuations in the torsional torque are larger than the specified value based on the magnitude of the fluctuation width. Furthermore, for example, the torsional torque of the driveshaft 30 may be detected by a sensor, and it may be determined whether the fluctuations in the torsional torque are larger than the specified value. In such a case, the steps S30, S40, S50, S130, S140, and S150 in the flowchart in FIG. 7 are replaced with a step for determining whether the fluctuations in the torsional torque are larger than the specified value based on the magnitude of the fluctuation width of the transmission input rotational speed Ni or a step for determining whether the fluctuations in the torsional torque, which are detected by the sensor, are larger than the specified value. Just as described, the flowchart in FIG. 7 can appropriately be changed.

In the above-described embodiment, the clutch pedal 36 is provided. However, the disclosure is not limited to this aspect. For example, a switch may be provided on the shift lever 38, and it is configured to switch the gear stage of the transmission 22 by operating the shift lever 38 while pressing the switch. In such a case, the clutch pedal 36 may not be provided. When pressing of this switch is detected, the clutch 18 may be actuated by the clutch actuator 20.

In the above-described embodiment, the transmission 22 is the known manual transmission that includes the plural pairs of the constantly-meshing transmission gears between the two shafts. However, the disclosure is not limited to this aspect. For example, the transmission may be a known transmission in which a gear stage is switched when engagement and disengagement of a meshing-type clutch are controlled by an actuator, a known dual clutch transmission (DCT) that is a transmission including plural pairs of constantly-meshing transmission gears between two shafts and that includes two systems of input shafts, a known automatic transmission of a planetary gear type, a continuously variable transmission, or the like. The power transmission apparatus for the vehicle that includes such a transmission includes the clutch that connects and disconnects the power transmission route between the engine and the drive wheels. For example, in the power transmission apparatus for the vehicle that includes the continuously variable transmission, an engagement device that is provided in a known forward and reverse switching device functions as the clutch. In addition, the power transmission apparatus for the vehicle that includes such a transmission does not include the clutch pedal 36. That is, the disclosure can be applied to the power transmission apparatus for the vehicle that includes: the clutch that connects and disconnects the power transmission route between the engine and the drive wheels; and the clutch actuator that switches between engagement and disengagement of the clutch.

In the above-described embodiment, the disclosure has been described by using the power transmission apparatus 16 that is suitably used in the vehicle 10 of an FF type. However, the disclosure can also appropriately be applied to a power transmission apparatus for a vehicle that is used in a vehicle of another type, such as an FR type, for example.

In the above-described embodiment, the engine 12 is exemplified as the drive power source. This drive power source can be adopted by combining another motor, such as an electric motor, with the engine 12. In addition, the clutch 18 is the friction clutch of the dry single plate type. However, the clutch 18 may be a friction clutch of a wet single plate type or may be a friction clutch of wet multi-plate type.

Note that what has been described above is merely one embodiment and the disclosure can be implemented in aspects in which various modifications or improvements are made to the disclosure based on knowledge of a person skilled in the art.

What is claimed is:

1. A vehicle comprising:
an engine;
a drive wheel;
a clutch configured to connect and disconnect a power transmission route between the engine and the drive wheel;
a clutch actuator configured to switch between engagement and disengagement of the clutch;
a transmission provided in the power transmission route between the clutch and the drive wheel; and
an electronic control unit configured to:
switch an actuation state of the clutch by the clutch actuator;
determine whether fluctuations in torsional torque generated in the power transmission route between the clutch and the drive wheel are larger than a specified value; and
control the clutch so as to increase torque capacity of the clutch when the electronic control unit determines that the fluctuations in the torsional torque are larger than the specified value during deceleration traveling of the vehicle, wherein
the electronic control unit is configured to determine whether the fluctuations in the torsional torque are larger than the specified value, based on a magnitude of fluctuation width of an input rotational speed of the transmission in a specified period, and
the electronic control unit is configured to determine that the fluctuations in the torsional torque are larger than the specified value when a value of an integral of a speed difference between a speed of the engine and the input rotational speed of the transmission in the specified period is equal to or larger than a predetermined first determination value.

2. The vehicle according to claim 1, wherein
the electronic control unit is configured to:
determine whether the value of the integral of the speed difference between the speed of the engine and the input rotational speed of the transmission is smaller than a predetermined second determination value that is smaller than the predetermined first determination value; and
terminate control for increasing the torque capacity of the clutch when the electronic control unit determines that the value of the integral is smaller than the predetermined second determination value.

3. The vehicle according to claim 1, wherein
the electronic control unit is configured to control the clutch actuator so as to engage the clutch when the electronic control unit determines that the fluctuations in the torsional torque are larger than the specified value when the clutch is disengaged during deceleration traveling of the vehicle.

4. A vehicle comprising:
an engine;
a drive wheel;
a clutch configured to connect and disconnect a power transmission route between the engine and the drive wheel;
a clutch actuator configured to switch between engagement and disengagement of the clutch; and an electronic control unit configured to:
switch an actuation state of the clutch by the clutch actuator;
determine whether fluctuations in torsional torque generated in the power transmission route between the clutch and the drive wheel are larger than a specified value; and
control the clutch so as to increase torque capacity of the clutch when the electronic control unit determines that the fluctuations in the torsional torque are larger than the specified value during deceleration traveling of the vehicle,
wherein the electronic control unit is further configured to:
compute an increased torque capacity of the clutch that is required to suppress the fluctuations in the torsional torque;
switch the actuation state of the clutch by the clutch actuator such that a driver requested torque capacity is obtained, the driver requested torque capacity being based on an operation of a clutch pedal by a driver of the vehicle; and
control the clutch so as to increase the torque capacity by the smaller of (1) the increased torque capacity and (2) a differential torque capacity which is a difference between a maximum torque capacity of the clutch and the driver requested torque capacity.

5. The vehicle according to claim 4, wherein the electronic control unit is configured to control the clutch actuator so as to engage the clutch when the electronic control unit determines that the fluctuations in the torsional torque are larger than the specified value when the clutch is disengaged during deceleration traveling of the vehicle.

6. A controller for a vehicle, the vehicle including
an engine,
a drive wheel,
a clutch configured to connect and disconnect a power transmission route between the engine and the drive wheel,
a clutch actuator configured to switch between engagement and disengagement of the clutch, and
a transmission provided in the power transmission route between the clutch and the drive wheel,
the controller comprising
an electronic control unit configured to:
switch an actuation state of the clutch by the clutch actuator;
determine whether fluctuations in torsional torque generated in the power transmission route between the clutch and the drive wheel are larger than a specified value; and
control the clutch so as to increase torque capacity of the clutch when the electronic control unit determines that the fluctuations in the torsional torque are larger than the specified value during deceleration traveling of the vehicle, wherein
the electronic control unit is configured to determine whether the fluctuations in the torsional torque are larger than the specified value, based on a magnitude of fluctuation width of an input rotational speed of the transmission in a specified period, and
the electronic control unit is configured to determine that the fluctuations in the torsional torque are larger than the specified value when a value of an integral of a speed difference between a speed of the engine and the input rotational speed of the transmission in the specified period is equal to or larger than a predetermined first determination value.

7. The controller according to claim 6, wherein the electronic control unit is configured to:
determine whether the value of the integral of the speed difference between the speed of the engine and the input rotational speed of the transmission is smaller than a predetermined second determination value that is smaller than the predetermined first determination value; and
terminate control for increasing the torque capacity of the clutch when the electronic control unit determines that the value of the integral is smaller than the predetermined second determination value.

8. The controller according to claim 6, wherein the electronic control unit is configured to control the clutch actuator so as to engage the clutch when the electronic control unit determines that the fluctuations in the torsional torque are larger than the specified value when the clutch is disengaged during deceleration traveling of the vehicle.

9. A controller for a vehicle, the vehicle including
an engine,
a drive wheel,
a clutch configured to connect and disconnect a power transmission route between the engine and the drive wheel,
a clutch actuator configured to switch between engagement and disengagement of the clutch, and
a transmission provided in the power transmission route between the clutch and the drive wheel,
the controller comprising
an electronic control unit configured to:
switch an actuation state of the clutch by the clutch actuator;
determine whether fluctuations in torsional torque generated in the power transmission route between the clutch and the drive wheel are larger than a specified value; and
control the clutch so as to increase torque capacity of the clutch when the electronic control unit determines that the fluctuations in the torsional torque are larger than the specified value during deceleration traveling of the vehicle, wherein
the electronic control unit is further configured to:
compute an increased torque capacity of the clutch that is required to suppress the fluctuations in the torsional torque;
switch the actuation state of the clutch by the clutch actuator such that a driver requested torque capacity is obtained, the driver requested torque capacity being based on an operation of a clutch pedal by a driver of the vehicle; and
control the clutch so as to increase the torque capacity by the smaller of (1) the increased torque capacity and (2) a differential torque capacity which is a difference between a maximum torque capacity of the clutch and the driver requested torque capacity.

10. The controller according to claim 9, wherein the electronic control unit is configured to control the clutch actuator so as to engage the clutch when the electronic control unit determines that the fluctuations in the torsional torque are larger than the specified value when the clutch is disengaged during deceleration traveling of the vehicle.

11. A control method for a vehicle, the vehicle including an engine, a drive wheel, a clutch configured to connect and disconnect a power transmission route between the engine and the drive wheel, a clutch actuator configured to switch between engagement and disengagement of the clutch, and an electronic control unit configured to switch an actuation state of the clutch by the clutch actuator, the control method comprising:

determining, by the electronic control unit, whether fluctuations in torsional torque generated in the power transmission route between the clutch and the drive wheel are larger than a specified value; and controlling the clutch by the electronic control unit so as to increase torque capacity of the clutch when the electronic control unit determines that the fluctuations in the torsional torque are larger than the specified value during deceleration traveling of the vehicle, wherein the electronic control unit determines whether the fluctuations in the torsional torque are larger than the specified value, based on a magnitude of fluctuation width of an input rotational speed of a transmission in a specified period, the transmission is provided in the power transmission route between the clutch and the drive wheel, and the electronic control unit determines that the fluctuations in the torsional torque are larger than the specified value when a value of an integral of a speed difference between a speed of the engine and the input rotational speed of the transmission in the specified period is equal to or larger than a predetermined first determination value.

12. The control method according to claim 11, wherein the electronic control unit determines whether the value of the integral of the speed difference between the speed of the engine and the input rotational speed of the transmission is smaller than a predetermined second determination value that is smaller than the predetermined first determination value, and control for increasing the torque capacity of the clutch is terminated by the electronic control unit when the electronic control unit determines that the value of the integral is smaller than the predetermined second determination value.

13. The control method according to claim 11, wherein the clutch actuator is controlled by the electronic control unit so as to engage the clutch when the electronic control unit determines that the fluctuations in the torsional torque are larger than the specified value when the clutch is disengaged during deceleration traveling of the vehicle.

14. A control method for a vehicle, the vehicle including an engine, a drive wheel, a clutch configured to connect and disconnect a power transmission route between the engine and the drive wheel, a clutch actuator configured to switch between engagement and disengagement of the clutch, and an electronic control unit configured to switch an actuation state of the clutch by the clutch actuator, the control method comprising:

determining, by the electronic control unit, whether fluctuations in torsional torque generated in the power transmission route between the clutch and the drive wheel are larger than a specified value; and controlling the clutch by the electronic control unit so as to increase torque capacity of the clutch when the electronic control unit determines that the fluctuations in the torsional torque are larger than the specified value during deceleration traveling of the vehicle, wherein an increased torque capacity of the clutch is computed by the electronic control unit, the increased torque capacity being required to suppress the fluctuations in the torsional torque, and the control method further comprises:

switching the actuation state of the clutch by the clutch actuator with the electronic control unit such that a driver requested torque capacity is obtained, the driver requested torque capacity being based on an operation of a clutch pedal by a driver of the vehicle; and controlling the clutch by the electronic control unit so as to increase the torque capacity by the smaller of (1) the increased torque capacity and (2) a differential torque capacity which is a difference between a maximum torque capacity of the clutch and the driver requested torque capacity.

15. The control method according to claim 14, wherein the clutch actuator is controlled by the electronic control unit so as to engage the clutch when the electronic control unit determines that the fluctuations in the torsional torque are larger than the specified value when the clutch is disengaged during deceleration traveling of the vehicle.

* * * * *